Patented Jan. 20, 1925.

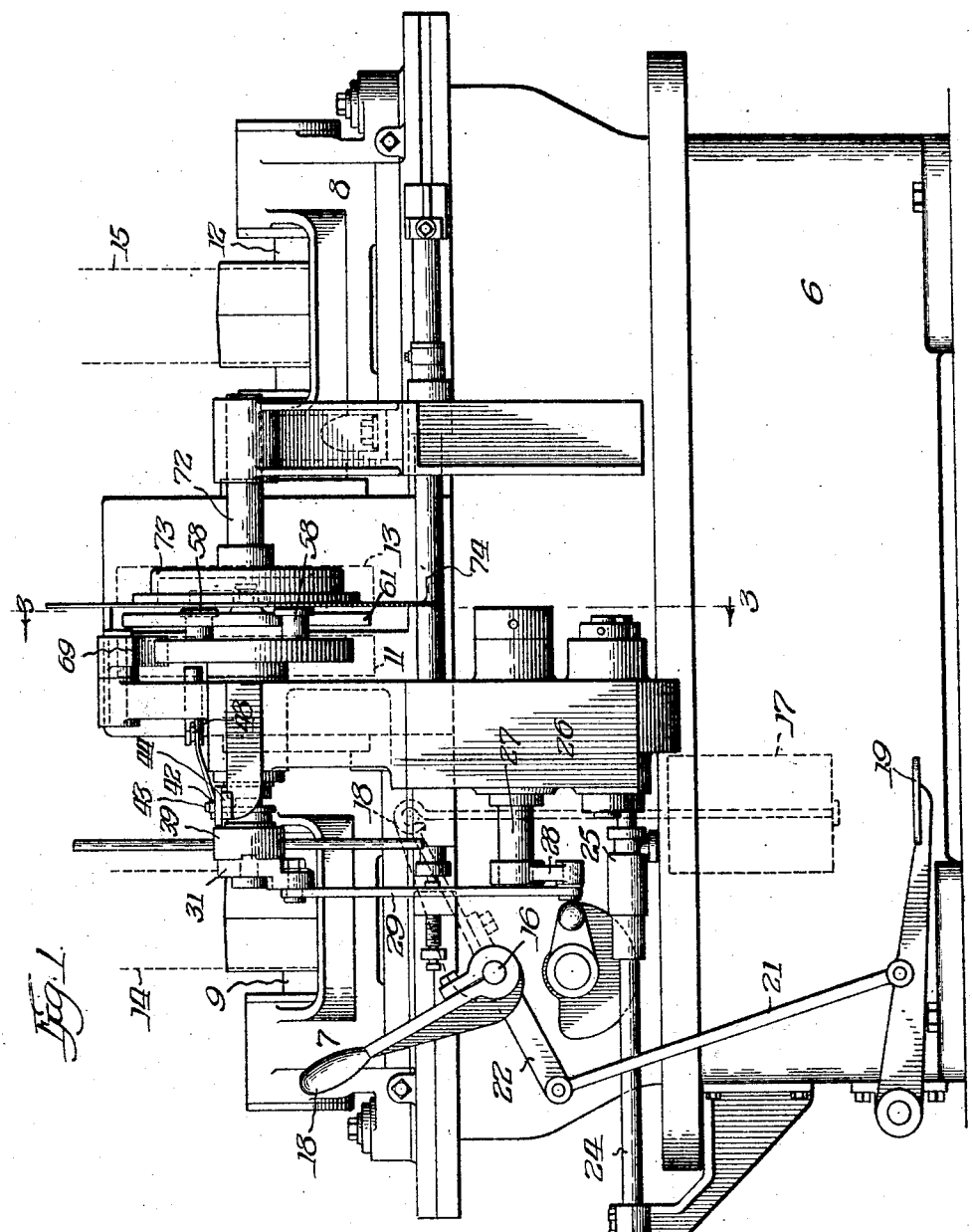

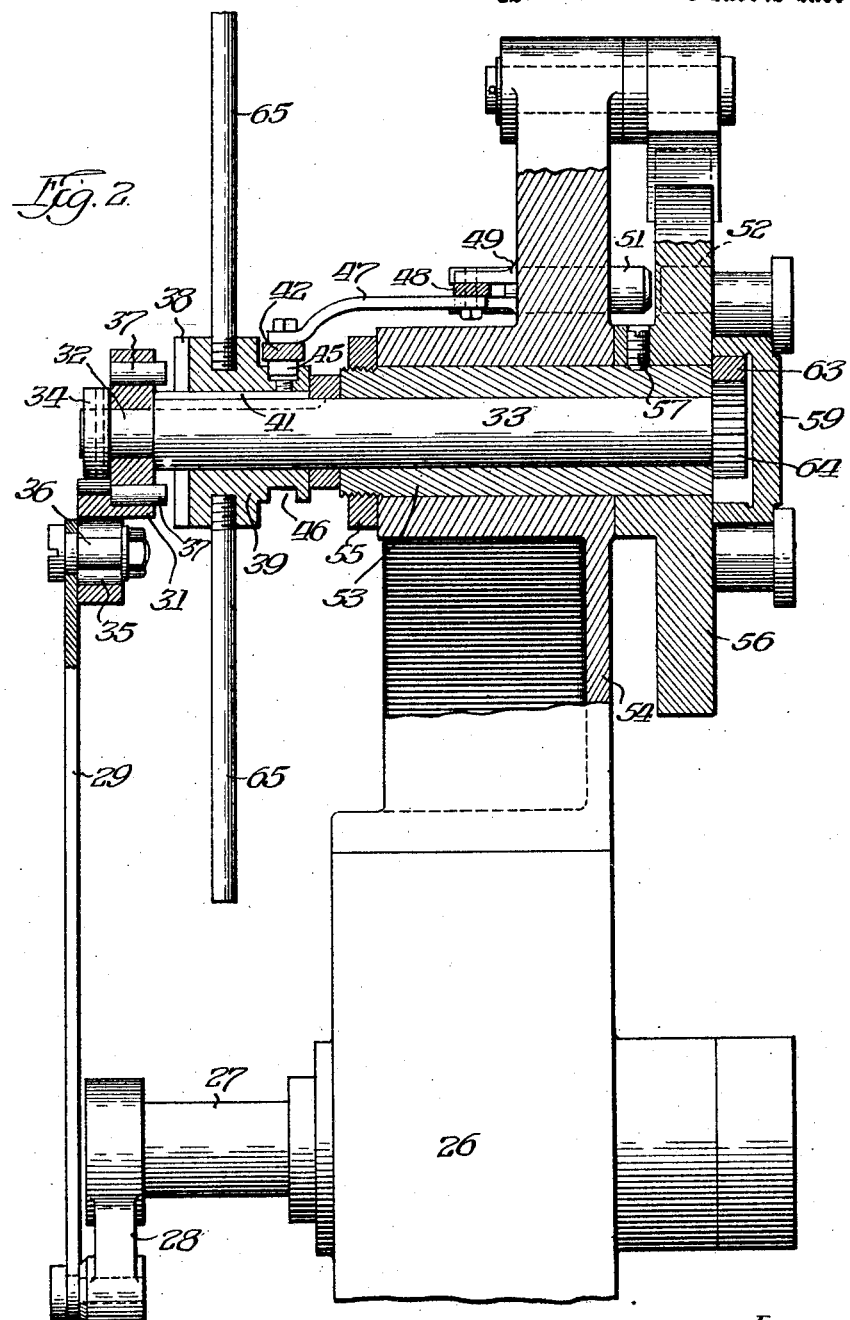

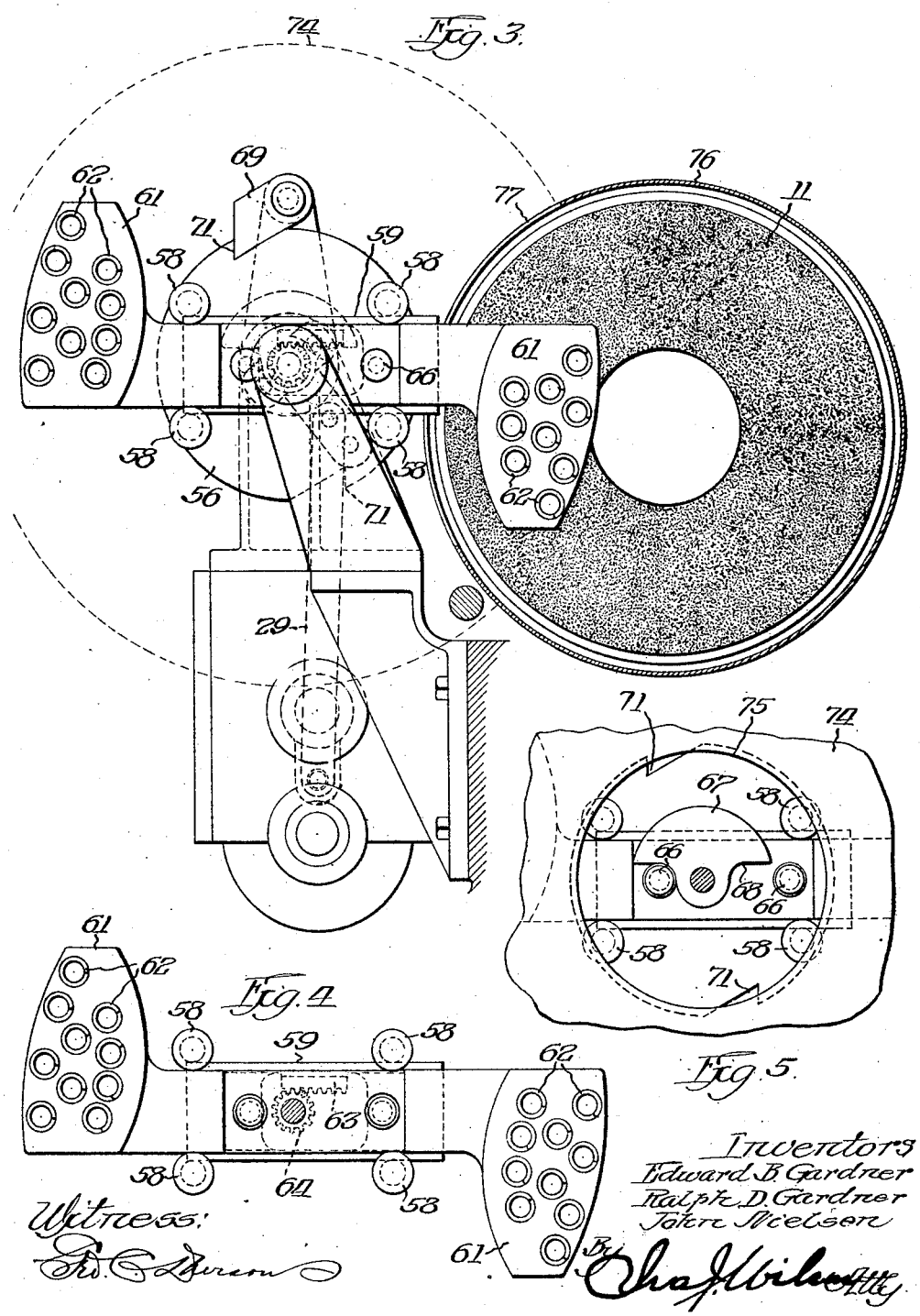

1,523,952

UNITED STATES PATENT OFFICE.

EDWARD B. GARDNER, RALPH D. GARDNER, AND JOHN NIELSEN, OF BELOIT, WISCONSIN.

GRINDING MACHINE.

Application filed November 12, 1923. Serial No. 674,121.

*To all whom it may concern:*

Be it known that we, EDWARD B. GARDNER, RALPH D. GARDNER, and JOHN NIELSEN, citizens of the United States, residing at Beloit, in the county of Rock and State of Wisconsin, have invented certain new and useful Improvements in Grinding Machines, of which the following is a specification.

This invention pertains in general to grinding machines, and while capable of employment with slight modification for grinding various objects, the invention is shown in the present application for illustrative purposes as embodied in a machine for grinding the ends of coil springs.

The general construction of the machine body, grinding tools and the mechanism for moving the tools toward and from each other is shown in detail in Patent 1,436,759 granted to E. B. Gardner, November 28th, 1922, and only so much therefore of the general construction of the machine as is necessary for an understanding of our present invention is illustrated and described herein.

Machines for the general purpose indicated have prior to our invention so far as we are aware consisted of a pair of grinding wheels between which a work carrier, in which the springs were rotated, was manually inserted. In order to distribute the wear over the grinding surface of the wheels this work carrier was manually reciprocated during the grinding operation and when each operation was completed the wheels were separated from each other by hand or foot power and the carrier was withdrawn. It was then unloaded, reloaded and reintroduced into working position between the wheels, but during the unloading and reloading the wheels were operating idly resulting in a considerable loss of time as well as power.

One of the primary purposes of our present invention is to provide a machine in which the idling periods will be reduced to a minimum so that the machine will be capable of maximum production. With this general purpose in view our invention contemplates the provision of a work carrier comprising two work carrying heads adapted to be alternately indexed into working position between grinding wheels so that while the springs in one head are being ground the other head may be unloaded and reloaded.

Another object of the invention is to relieve the operator from much of the manual labor heretofore required in performing these grinding operations and to this end our invention provides a mechanism by which the work carrying heads are automatically reciprocated between the grinding wheels during the grinding operation, thereby distributing the wear over the surfaces of the grinding wheels and relieving the operator of this burden which has heretofore been manually performed.

Other objects are to provide a machine which will be accurate, reliable, durable and speedy in operation and one which can be economically manufactured and operated.

To facilitate an understanding of our invention we have illustrated on the accompanying drawings a preferred embodiment thereof, referring to which:

Fig. 1 is a side elevation of the machine;

Fig. 2 is a fragmentary view partially in section showing the work carrying, indexing and reciprocating mechanism;

Fig. 3 is a transverse sectional view taken substantially on the line 3—3 of Fig. 1;

Fig. 4 is a detail of the work carrier; and

Fig. 5 is a fragmentary view showing the work carrier locking mechanism.

Referring to the machine generally and to such details thereof only as are necessary to an understanding of our present invention, it will be observed upon inspection of Fig. 1 that the machine comprises a base 6 upon the top of which two carriages indicated by reference characters 7 and 8, respectively, are mounted to slide longitudinally of the frame toward and from each other. In the carriage 7 is journaled shaft 9 carrying at its inner end a grinding tool in the form of an abrasive wheel 11, and similarly in the carriage 8 there is journaled a shaft 12 carrying at its inner end a similar grinding tool 13 arranged in opposed relation to the tool 11. The shafts 9 and 12 are rotated to revolve the tools 11 and 13 in the same direction by any suitable driving means. For instance, the shafts may be directly connected to motors or they may be driven by means of belts 14 and 15 from any suitable source of power.

The carriages are moved on the frame to bring the grinding tools into operative relation with springs disposed between them so that both ends of the springs will be operated upon simultaneously by the tools and will intermittently withdraw from each other to permit the withdrawal of the work and the insertion of new work by any suitable mechanism.

Preferably, however, the two carriages are provided with racks engaging with a pinion mounted upon a shaft 16 as is shown and described in the prior patent previously referred to, and this shaft is normally urged in a clockwise direction by a weight 17 suspended from a lever 18 attached to the shaft and may be oscillated in a counter-clockwise direction to separate the grinding tools from each other either by the hand lever 18 or by foot treadle 19 connected to the shaft through the intermediary of a link 21 and an arm 22 fixed on the shaft.

Power is applied to the machine from any suitable source through a cone pulley 23 mounted on the outer end of a main driving shaft 24 connected through the intermediary of a clutch 25 with a train of step-down gearing of well known or preferred construction mounted in the gear box 26. From this gear box a slowly driven shaft 27 projects and at its outer end is equipped with a crank 28 connected by a link 29 with an arm 31 loosely mounted upon the reduced outer end 32 of a shaft 33. A collar 34 pinned to the shaft retains the arm 31 in position thereon. It will be observed from Fig. 2 that arm 31 is provided with an elongated slot 35 so that the bolt 36 connecting the link 29 to the arm may be adjusted to vary the extent of throw of the arm 31 and consequently the limits of oscillation of the shaft 33.

A pair of clutch pins 37 project from the inner face of the arm 31 in position to engage in a groove 38 formed in the opposed face of a clutch member 39 slidably secured by a spline 41 to the shaft 33. A clutch operating member 42, pivoted at one end by a bolt 43 to a bracket 44 on the main frame, is provided at its free end with a stud 45 (Fig. 2) engaged in a circumferential groove 46 formed in the clutch member 39, and this operating member is connected by a link 47 to an operating lever 48 fulcrumed between ears 49 projecting laterally from the standard of the machine. The rear end of the lever is pivotally connected with a locking pin 51 slidably mounted in said standard and adapted to lockingly engage with the indexing wheel as will be later explained. When the lever 48 is in the position shown in the drawings, the locking pin 51 is withdrawn into inoperative position and the clutch member 39 is also withdrawn from operative relation to the clutch pins 37, but upon movement of the inner end of the lever 48 to the left, viewing Figs. 1 and 2, the clutch member 39 is engaged with the arm 31 and the pin 51 is projected into an opening 52 in the indexing wheel to thereby lock the same against rotation.

The shaft 33 is journaled in a sleeve 53 which in turn is journaled in the standard 54, as is apparent from Fig. 2. This sleeve is held against longitudinal displacement in one direction by a locking nut 55 threaded thereon and against movement in the opposite direction by the hub of the indexing wheel 56 fixedly secured to the sleeve by one or more set screws 57. The shaft is free to turn within the sleeve and the sleeve is capable of rotation relatively to the shaft for indexing purposes as will readily be apparent.

The indexing wheel 56 is provided on its outer face with two pairs of guide rollers 58 between which a work carrier, indicated generally by reference character 59, is adapted to reciprocate longitudinally. This work carrier is provided at each end with a work carrying head 61, each head being provided with a plurality of work holding apertures adapted to receive and retain the coiled springs 62, the ends of which are ground into parallelism by our invention. The central portion of the work carrier 59 is equipped with a depending rack 63 meshing with a pinion 64 fixed upon the inner end of shaft 33 so that when the shaft 33 is oscillated, the oscillatory movements of the pinion will impart reciprocatory movements to the work carrier, thereby reciprocating the head 61 disposed between the grinding wheels so as to distribute the wear of the grinding operation over the surfaces of the wheels and prevent the formation of grooves and ridges in the grinding faces.

During the time that the springs carried by the head 61, for instance, are being ground the other head, which is in position accessible to the operator, is being unloaded and reloaded. The indexing wheel 56, which carries the heads, is then indexed through an arc of 180° in a counter-clockwise direction, viewing Fig. 3, thus reversing the positions of the heads. This indexing operation is manually performed and in carrying out the operation the operator first shifts the lever 48 to the right, thereby withdrawing the locking pin 51 from the wheel 56 and at the same time releasing the clutch by moving the clutch member 39 to the right into position shown in Fig. 2. The operator then slides the carrier to the extreme "in" position shown in Fig. 3 by either pushing upon the exposed carrier head or by rocking the shaft 33 through the instrumentality of one or the other of the handles 65. The purpose of this inward movement of the carrier is to move one of the studs 66 beyond the point of stationary locking member 67 best shown in Fig. 5 so that the carrier will be free to index in a counter-clockwise direction. This indexing is now accomplished by pushing downwardly upon the outer carrier head, thereby swinging the plate 56 and carrier through an arc of 180°. The indexing movement will be automatically stopped when this position is reached by engagement of the other stop 66 upon the carrier 59 with the lower face 68 of the locking member 67. When the indexing has been accomplished the shift lever 48 is swung to the left to insert the locking pin 51 into the aperture 52 and to engage the clutch member 39 with the clutch 37, thereby inaugurating the reciprocatory movements of the carrier relatively to the grinding wheels. Just prior to the indexing operation the operator depresses the treadle 19 to separate the grinding wheels one from the other and when the indexing has been completed pressure upon this treadle is removed, thereby permitting the weight 17 to urge the grinding wheels into operative relation to the springs disposed in the carrier head. Rotative movement of the carrier in a reverse direction is precluded by a pawl 69 which engages in one or the other of two diametrically disposed notches 71 formed on the periphery of the disk 56. The locking member 67 is carried upon the inner end of a stationary shaft 72 disposed in alignment with the shaft 33 and the locking member and adjacent parts are housed for protective purposes within a dished housing 73 mounted upon the shaft 72. A plate 74 is also carried by this housing, the plate being provided with an aperture 75 to permit of the rotative movements of the studs 66. This plate, as will be apparent from Fig. 1, is disposed close to the path of the carrier heads and serves as a backing plate to limit the insertion of the spring into the openings in the carrier heads and also assists in retaining the springs in the heads during the indexing movements. This plate, as will be apparent from Fig. 3, terminates at the housing 76 which encloses the grinding wheels and is provided with a slot or opening 77 through which the carrier heads travel during the indexing movements.

In operating our improved machine the operator loads one of the heads while the springs in the other head are being ground. He then separates the grinding wheels by depressing the treadle 19, unclutches the shaft 33 and simultaneously unlocks the carrier wheel 56 by shifting the lever 48 to the right. The carrier is then moved to "in" position to release the stud 66 from the locking member 67, whereupon the indexing through an arc of 180° is performed. The operator then shifts the lever 48 in the opposite direction to lock the indexing wheel and connect the clutch so that a reciprocatory movement is imparted to the carrier from the crank 28 through the arm 35, shaft 33, pinion 64, and rack 63. The foot treadle is then released and the grinding operation proceeds while the operator removes the ground springs from the exposed carrier head and replaces them with other springs to be ground in the next operation.

It is believed that the construction, mode of operation and many of the attendant advantages of our invention will be understood from the foregoing without further description and it should be manifest that the structural details illustrated and described are capable of wide modification without exceeding the scope of the invention as defined in the following claims.

We claim:

1. In a grinding machine the combination of a rotatable grinding tool, a work carrier comprising a pair of carrying heads adapted to be alternately disposed in working position relatively to said tool, means for preventing movement from said position, and means for reciprocating said carrier in said positon to distribute the wear on said tool.

2. In a grinding machine the combination of a rotatable grinding tool, a work carrier comprising a plurality of work carrying heads, and indexing wheel upon which said carrier is mounted, means for normally preventing indexing movement of said wheel, and means for reciprocating said carrier relatively to the wheel.

3. In a grinding machine the combination of a rotatable grinding tool, a work carrier comprising a plurality of heads rotatably mounted so as to be alternately disposed in working position, and means for reciprocating said carrier during the grinding operation to distribute the wear on said tool.

4. In a grinding machine the combination of a pair of opposed grinding tools, an indexing wheel, a work carrier mounted on said wheel and comprising a plurality of heads adapted to be positioned successively between said tools, and means for reciprocating said carrier relatively to the tools.

5. In a grinding machine the combination of a pair of opposed grinding tools, a rotatable indexing wheel, means for preventing reverse rotation of the wheel, a work carrier slidably mounted on said wheel, means for reciprocating said carrier on the wheel, and means whereby said wheel may be indexed.

6. In a grinding machine the combination of a grinding tool, a rotatable indexing wheel, a work carrier slidably mounted on the wheel, means for holding said wheel against rotation except when said carrier is disposed in one of its extreme positions, said means being adapted to limit the indexing movement of the carrier, and means for reciprocating said carrier in indexed position.

7. In a grinding machine the combination of a pair of opposed grinding tools, a rotatable indexing wheel, a work carrier slidably mounted upon the face of said wheel, said carrier being provided with a pair of work carrying heads adapted to be disposed between said grinding tools, means including an oscillating shaft for reciprocating said carrier on said wheel, and means for preventing indexing movement of the carrier except when said carrier is disposed in a predetermined position.

8. In a grinding machine the combination of a pair of opposed grinding tools, a work carrier, mounted so as to be capable of rotation for indexing purposes and of reciprocation in indexed position, and means normally holding said carrier against indexing movement, said means being releasable upon longitudinal movement of said carrier to a predetermined position.

9. In a grinding machine the combination of a grinding tool, and a work carrier comprising a plurality of work carrying heads, said carrier being rotatably mounted to permit indexing movement of the heads, and also slidably mounted to permit of reciprocatory movements during the grinding operation.

10. In a grinding machine the combination of a grinding tool, a work carrier comprising a plurality of work carrying heads, a rotatable support for said carrier by which the carrier heads are successively indexed into operative position, and means for slidably mounting said carrier upon said support to permit of reciprocatory movements of the carrier during grinding operation.

11. In a grinding machine the combination of a rotatable grinding tool, an indexing wheel, a work carrier slidably mounted upon said wheel, means for reciprocating said carrier on the wheel, and means for locking said wheel against reverse movement.

12. A grinding machine comprising a grinding tool, a rotatable indexing wheel, a pawl for preventing reverse rotation of said wheel, a work carrier slidably mounted upon the face of the wheel, means for reciprocating said carrier longitudinally, a fixed locking member, and a pair of studs on said carrier adapted to engage said locking member to prevent indexing movement of the carrier, one of said studs being releasable from said member upon movement of the carrier to extreme position.

13. A grinding machine comprising a grinding tool, a work carrier provided with a plurality of work carrier heads, means for indexing said carrier to bring the heads successively into operative relation to said tool, means for reciprocating said carrier, said means including an adjustable connection to vary the reciprocatory stroke of the carrier, and means including a fixed locking member and a pair of studs for releasably locking said carrier against indexing movement and for limiting the extent of said indexing movement.

EDWARD B. GARDNER.
RALPH D. GARDNER.
JOHN NIELSEN.